(12) United States Patent
Baumann et al.

(10) Patent No.: US 7,291,653 B2
(45) Date of Patent: Nov. 6, 2007

(54) PREPARATION OF HYDROPHOBIC ORGANIC AEORGELS

(75) Inventors: Theodore F. Baumann, Tracy, CA (US); Joe H. Satcher, Jr., Patterson, CA (US); Alexander E. Gash, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/927,679

(22) Filed: Aug. 26, 2004

(65) Prior Publication Data

US 2005/0027027 A1 Feb. 3, 2005

(51) Int. Cl.
C08J 9/28 (2006.01)
(52) U.S. Cl. ............................ 521/64; 521/53; 521/61; 521/113; 521/128; 521/180; 521/181
(58) Field of Classification Search ................. 521/53, 521/61, 64, 113, 128, 180, 181
See application file for complete search history.

(56) References Cited

U.S. PATENT DOCUMENTS

| | | | | |
|---|---|---|---|---|
| 2,805,961 A | | 9/1957 | Puddington et al. | |
| 3,872,034 A | * | 3/1975 | Dickert | 521/107 |
| 4,112,160 A | * | 9/1978 | Kako et al. | 428/460 |
| 5,476,878 A | * | 12/1995 | Pekala | 521/61 |
| 5,908,896 A | * | 6/1999 | Mayer et al. | 524/596 |
| 6,288,132 B1 | * | 9/2001 | Schwarz | 521/53 |
| 6,599,953 B1 | * | 7/2003 | Ratke et al. | 521/180 |

* cited by examiner

*Primary Examiner*—Irina S Zemel
(74) *Attorney, Agent, or Firm*—Ann M. Lee; Alan H. Thompson; John H. Lee

(57) ABSTRACT

Synthetic methods for the preparation of hydrophobic organics aerogels. One method involves the sol-gel polymerization of 1,3-dimethoxybenzene or 1,3,5-trimethoxybenzene with formaldehyde in non-aqueous solvents. Using a procedure analogous to the preparation of resorcinol-formaldehyde (RF) aerogels, this approach generates wet gels that can be dried using either supercritical solvent extraction to generate the new organic aerogels or air dried to produce an xerogel. Other methods involve the sol-gel polymerization of 1,3,5 trihydroxy benzene (phloroglucinol) or 1,3 dihydroxy benzene (resorcinol) and various aldehydes in non-aqueous solvents. These methods use a procedure analogous to the one-step base and two-step base/acid catalyzed polycondensation of phloroglucinol and formaldehyde, but the base catalyst used is triethylamine. These methods can be applied to a variety of other sol-gel precursors and solvent systems. These hydrophobic organics aerogels have numerous application potentials in the field of material absorbers and water-proof insulation.

14 Claims, No Drawings

PREPARATION OF HYDROPHOBIC ORGANIC AEORGELS

The United States Government has rights in this invention pursuant to Contract No. W-7405-ENG48 between the United States Department of Energy and the University of California for the operation of Lawrence Livermore National Laboratory.

RELATED APPLICATION

This application relates to U.S. Provisional Application No. 60/292,238 filed May 18, 2001 and claims priority thereof.

BACKGROUND OF THE INVENTION

The present invention relates to solvent removal from water with hydrophobic aerogels, particularly to the preparation of hydrophobic organic aerogels, and more particular to synthetic methods for the preparation of hydrophobic organic aerogels.

The key property of the porous materials that inhibits wetting by liquid water, is hydrophobicity. This property requires that the interfacial energy of the solid-liquid, is greater than that for the solid-vapor. Such a property is inherent for many polymers; the best examples of which are polyethylene, and polytetrafluoroethylene (Teflon). Other material such as carbons and inorganic oxides, including aerogels, generally have low liquid-solid interfacial energies and their surfaces have to be chemically modified to make them hydrophobic.

Aerogels are a special class of open-cell foams derived from highly cross-linked inorganic or organic gels that are dried using special techniques to preserve the tenuous solid network. These materials have ultrafine cell/pore sizes, continuous porosity, high surface area, and a microstructure composed of interconnected colloidal-like particles or polymeric chains with characteristic diameters of 100 Å. This microstructure is responsible for the unusual optical, acoustical, thermal, and mechanical properties of aerogels. By definition, these materials are prepared through the sol-gel process and can be either granular or monolithic. Organic aerogels are typically prepared from the sol-gel polymerization of resorcinol and formaldehyde and are dried through supercritical extraction of the reaction solvent. Recent efforts have focused on the ability to tailor the bulk properties of organic aerogels for specific applications. One area of interest is the design of hydrophobic organic aerogels.

While there are several reported ways to make hydrophobic silica aerogels, it has been found that silica aerogels which are doped with fluorinated organic groups exhibit the highest degree of hydrophobicity. By measurement of the contact angles for a variety of hydrophobic aerogels, including tri-methyl, tri-fluoro, and methoxy terminated siloxanes, it has been determined that the 3,3,3-trifluoropropyl containing aerogels have the highest contact angles for all cases of silica aerogels. It was found that silica aerogels doped with 30% by weight of the flouro-propyl compound, gave a contact angle $\geq 150°$, and was transparent. Such hydrophobic inorganic or silica aerogels are described and claimed in copending U.S. application Ser. No. 09/957,854, filed Sep. 21, 2001, entitled "Method For Removing Organic Liquids From Aqueous Solutions and Mixtures"; Ser. No. 09/957,853, filed Sep. 21, 2001, entitled "Super-Hydrophobic Fluorine Containing Aerogels; and Ser. No. 09/960,593, filed Sep. 21, 2001, entitled "Method of Oil Spill Recovery Using Hydrophobic Sol-Gels and Aerogels". Also, see L. W. Hrubesh, "Solvent Removal from Water with Hydrophobic Aerogels, J. Nanocrystalline Solids" 285 (1-3), 328-32, 2001, for the verification of hydrophobic silica aerogels.

The present invention involves the use of the hydrophobic organic aerogels for removal or organics from an oil-water mixture for example, and more specifically the present invention provides synthetic methods for the preparation of hydrophobic organic aerogels. One of these methods particularly involves the sol-gel polymerization of 1,3-dimethoxybenze or 1,3,5-trimethoxybenzene with formaldehyde in non-aqueous solvents. Other of these methods involves the sol-gel polymerization of 1,3,5-trihydroxy benzene or 1,3-dihydroxy benzene and various aldehydes in non-aqueous solvents. These methods can be applied to a variety of other sol-gel precursors and solvent systems for producing hydrophobic organic aerogels.

SUMMARY OF THE INVENTION

It is an object of the present invention to provide hydrophobic organic aerogels.

A further object of the invention is to provide a method for preparation of hydrophobic organic aerogels.

Another object of the invention is to provide methods for preparation of hydrophobic organic aerogels which can be utilized for a variety of sol-gel precursors and solvent systems.

Another object of the invention is to provide methods for the preparation of hydrophobic organic aerogels that involves the sol-gel polymerization of 1,3-dimethorybenzene or 1,3,5-trimethoxybenzene with formaldehyde in non-aqueous solvents.

Another object of the invention is to provide methods for the preparation of hydropholic organic aerogels that involves the sol-gel polymerization of 1,3,5-trihydroxy benzene (phloroglucinol) or 1,3-dihydroxy benzene (resorcinol) and various aldehydes in non-aqueous solvents.

Other objects and advantages of the invention will become apparent from the following description. Basically, the invention involves hydrophobic organic aerogels and methods for the preparation thereof. These aerogels have potential utility as new sorbants for the removal of organic pollutants from water supplies or as water-proof insulation. While one of the methods is described, for example, involving sol-gel polymerization of 1,3,5-trimethoxybenzene and formaldehyde in N,N-dimethylformamide, the method can be applied to a variety of phenol derivatives and solvent systems, such as 1,3,5-trihydroxy benzene (phloroglucino) or 1,3-dihydroxy benzene (resorcinol) and various aldehydes (ethanol, propanal, benzyaldehyde, glutaricdialdehyde, and 4,4,4-trifluorobutanal) in non-aqueous solvents and in the presence of base catalyst triethylamine, using a procedure analogous to the preparation of resorcinol-formaldehyde (RF) aerogels, or a procedure analogous to both the one-step base and two-stepbase/acid-catalyzed polycondensation of phloroglucinal and formaldehyde. These methods generate wet flexible gels that can be dried using either supercritical solvent extraction to generate the new (hydrophobic) organic aerogels or dried to produce the xerogel, The method of this invention involves a simple and straightforward process for the generations of hydrophobic organic aerogels.

DETAILED DESCRIPTION OF THE INVENTION

The present invention involves a hydrophobic organic aerogels and the preparation thereof. More specifically the invention involves synthetic methods for the preparation of hydrophobic organic aerogels utilizing a sol-gel polymerization technique of selected materials. For example, a hydrophobic organic aerogel can be produced by a process involving the sol-gel polymerization of 1,3-dimethoxybenzene or 1,3,5-trimethoxybenzene with formaldehyde in non-aqueous solvents. Using a procedure analogous to the preparation of resorcinol-formaldehyde (RF) aerogels, such as disclosed in U.S. Pat. Nos. 5,476,878 and 5,731,360, for example, this approach generates wet gels that can be dried using either supercritical solvent extraction to generate the hydrophobic aerogels or air dried to produce the hydrophobic xerogels. Also, a hydrophobic organic aerogel can be produced by a process involving the sol-gel polymerization of 1,3,5-trthydroxy benzene (phioroglucinol) or 1,3-dihydroxy benzene (resorcinol) and various aldehydes (ethanol, propanal, benzaldehyde, glutaricdialdehyde, and 4,4,4-trifluorobutanal in non-aqueous solvents, using a procedure analogous to both the one-step base and two-step base/acid-catalyzed polycondensation of phloroglucinol and formaldehyde, but where the base catalyst used is triethylamine, and the acid catalyst used is hydrochloric acid. These later methods generate wet rigid gels that can be dried using either supercritical solvent extraction to make aerogels or air dried to produce xerogels. On one such material, an aerogel from the polycondensation of phloroglucinol and propyl aldehyde, water forms a tight bead with a contact angle of 445°. The procedures of this invention as exemplified hereinbelow are general and can be applied to a variety of other sol-gel precursors and solvent systems. These hydrophobic aerogels possess unique and interesting properties and find use in the field of filtration, such as for removing organic pollutants from water, field of insidation, including waterproof insulation.

The present invention is first exemplified by the sol-gel polymerization of 1,3-dimethoxybenzene and formaldehyde in N,N-dimethylformamide. This procedure, however, is general and can be applied to a variety of other alkylated phenol derivatives, such as 1,3,5-trimethoxybenzene and formaldehyde, methoxybenzene and formaldehyde, and solvent systems such as DMSO, THF, acetone, and acetonitrile.

An example of this procedure is as follows:

To a solution of 1,3,5-trimethoxybenzene (18.8 g, 0.112 mol) in N,N-dimethylformamide (140 mL) was added a mixture of $Na_2CO_3H_2O$ (0.139 g, 0.0011 mol) in 37% formaldehyde solution (22.4 g, 0.224 mol) in water. The reaction mixture was stirred vigorously at room temperature for 0.5 hour. The clear solution was then poured into glass vials, sealed and cured at 80° C. for 3 days during which time the reaction turned to a dark orange color. While this procedure did not yield monolithic parts, it did afford a light yellow organic gel as a precipitate. The gel was then dried by both known procedures. The sol-gel was characterized for information such as density, surface area, pore volumes of the materials.

The present invention is next exemplified by the sol-gel polymerization of 1,3,5-trihydroxybenzene (phloroglucinol) and propanal in acetonitrile. This procedure is general and can be applied to the preparation of a variety of other aldehyde crosslinker systems, similar to, but not limited to ethanol, benzaldehyde, glutaricdialdehyde, and 4,4,4-trifluorobutanal. Also, the method can be carried out by the sol-gel polymerization of 1,3-dihydroxy benzene (resorcinol) and the above listed aldehydes. This exemplified procedure is as follows:

0.5 g of 1,3,5-trihydroxybenzene trihydrate (0.003 mol) was dissolved in 9 grams of acetonitrile (11.5 mL). To this solution 0.5 g of acetonitrile with 0.017 mL of triethylamine (0.00012 mol) in it was added to the stirring solution. The addition of triethylamine causes the instant formation of a white precipitate that dissolves rapidly in the stirring solution to give a clear faint yellow solution. To this solution, 0.36 g of propanal (0.006 mol) is added. The vessel the solution is in is then covered tightly and put into an oven at 80° C. for one hour. During this time, the solution changes color from light yellow to a dark red/orange color, however, the solution remains clear. After cooling to room temperature, 0.5 g of acetonitrile with 0.030 mL (0.0036 mol) of concentrated commercial hydrochloric acid was added to the clear red/orange solution. Within seconds of the addition of the acid catalyst, the solution becomes warm to the touch and within 1-2 minutes, a rigid clear red/orange gel was formed. This gel was extracted with liquid CO2 and then supercritically extracted to give a robust aerogel with a density of 145 mg/cc, surface area of 413 $m^2/g$, average pore diameter of 28.4 nm, and a pore volume of 3.49 $cm^3/g$. This synthesis can also be performed using just the one-step base catalyst (triethylamine); however, gel times in these cases are on the order of a few days. In addition, as pointed out above, the above procedure is possible using 1,3-dihydroxybenzene (resorcinol) as the phenolic starting material.

It has thus been shown that the present invention provides hydrophobic organic aerogels, and methods for producing such from a variety of alkylated phenol derivatives and solvent systems.

While particular procedures, materials, processing parameters has been described to exemplify and each the principles of the invention, such are not intended to be limited. Modifications and changes may become apparent to those skilled in the art, and it is intended that the invention be limited only by the scope of the appended claims.

What is claimed is:

1. An organic hydrophobic material selected from the group consisting of aerogels and xerogels, produced by a method comprising catalyzed sol-gel polymerization of an alkylated phenol derivative and an aldehyde in a solution with a non-aqueous solvent, and drying the sol-gel produces a hydrophobic gel.

2. The hydrophobic material of claim 1, wherein the alkylated phenol derivatives selected from the group consisting of 1,3-dimethoxybenzene, 1,3,5-trimethoxybenzene and methoxybenzene and the aldehyde is formaldehyde.

3. The hydrophobic material of claim 2, wherein the the non-aqueous solvent system is N,N-dimethylformamide.

4. The hydrophobic material of claim 1, wherein the alkylated phenol derivative comprises 1,3,5-trimethoxybenzene, the aldehyde comprises at least about 35% formaldehyde solution in water, the non-aqueous solvent system is N,N-dimethylformamide and the catalyst is $Na_2CO_3H_2O$.

5. The organic hydrophobic material of claim 1, comprising an aerogel having a density of at least about 125 mg/cc, and a surface area of at least about 400 $m^2/g$.

6. The aerogel of claim 5, additionally having a pore diameter of at least about 25 nm, and a pore volume of at least about 3.00 $cm^3/g$.

7. The hydrophobic material of claim 1, wherein the solvent system is selected from the group consisting of DMSO, THF, acetone, and acetonitrile.

8. An organic hydrophobic material selected from the group consisting of aerogels and xerogels produced by a method comprising catalyzed sol-gel polymerization of a phenol derivative and aldehyde in a solution with a non-aqueous solvent, wherein the catalyst is triethylamine, and drying the sol-gel produces a hydrophobic gel.

9. The hydrophobic material of claim 8, wherein the phenol derivative is 1,3,5-trihydroxybenzene, the aldehyde is propanal and the non-aqueous solvent system is acetonitrile.

10. The hydrophobic material of claim 8, wherein the phenol derivative comprises 1,3,dihydroxybenzene.

11. The hydrophobic material of claim 8, including the additional catalyst concentrated hydrochloric acid.

12. The hydrophobic material of claim 8, wherein the aldehyde is selected from the group consisting of ethanol, propanal, benzyaldehyde, glutaricdialdehyde and 4,4,4-trifluorobutanal.

13. The organic hydrophobic material of claim 8, comprising an aerogel having a density of at least about 125 mg/cc, and a surface area of at least about 400 $m^2$/g.

14. The aerogel of claim 13, additionally having a pore diameter of at least about 25 nm, and a pore volume of at least about 3.00 $cm^3$/g.

\* \* \* \* \*

UNITED STATES PATENT AND TRADEMARK OFFICE
CERTIFICATE OF CORRECTION

PATENT NO. : 7,291,653 B2 Page 1 of 1
APPLICATION NO. : 10/927679
DATED : November 6, 2007
INVENTOR(S) : Theodore F. Baumann, Joe H. Satcher, Jr. and Alexander E. Gash It is certified that error appears in the above-identified patent and that said Letters Patent is hereby corrected as shown below:

On the title page Item (54) Title: Should Read

(54) PREPARATION OF HYDROPHOBIC ORGANIC AEROGELS

Signed and Sealed this

Fourth Day of March, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,291,653 B2 | Page 1 of 1 |
| APPLICATION NO. | : 10/927679 | |
| DATED | : November 6, 2007 | |
| INVENTOR(S) | : Theodore F. Baumann, Joe H. Satcher, Jr. and Alexander E. Gash | |

It is certified that error appears in the above-identified patent and that said Letters Patent is hereby corrected as shown below:

On the title page Item (54) and Column 1 lines 1 and 2 Title: Should Read

(54) PREPARATION OF HYDROPHOBIC ORGANIC AEROGELS

This certificate supersedes the Certificate of Correction issued March 4, 2008.

Signed and Sealed this

First Day of April, 2008

JON W. DUDAS
*Director of the United States Patent and Trademark Office*